US011524597B2

(12) United States Patent
Colafrancesco et al.

(10) Patent No.: US 11,524,597 B2
(45) Date of Patent: Dec. 13, 2022

(54) CHARGING STATION FOR TRACKED MOBILE OBJECT

(71) Applicant: 7hugs Labs SAS, Montrouge (FR)

(72) Inventors: Julien Colafrancesco, Paris (FR); Simon Tchedikian, Issy-les-moulineaux (FR); Nicolas Schodet, Antony (FR); Stephane Jaubertou, Saint-Cloud (FR); Oliver Mandine, Le Plessis-Robinsson (FR); Lionel Marty, Issy-les-moulineaux (FR)

(73) Assignee: 7HUGS LABS SAS, Montrouge (FR)

( * ) Notice: Subject to any disclaimer, the term of this patent is extended or adjusted under 35 U.S.C. 154(b) by 0 days.

(21) Appl. No.: 17/087,959

(22) Filed: Nov. 3, 2020

(65) Prior Publication Data
US 2021/0070188 A1 Mar. 11, 2021

Related U.S. Application Data

(63) Continuation of application No. 16/049,133, filed on Jul. 30, 2018, now Pat. No. 10,821,848.

(51) Int. Cl.
G05D 1/00 (2006.01)
B60L 53/36 (2019.01)
(Continued)

(52) U.S. Cl.
CPC ............... *B60L 53/36* (2019.02); *B60L 53/16* (2019.02); *G05D 1/0011* (2013.01); *G05D 1/0225* (2013.01); *B60L 2270/40* (2013.01)

(58) Field of Classification Search
CPC .............. G05D 1/0011; G08C 2201/10; G08C 2201/91; G08C 2201/92; G08C 17/02
See application file for complete search history.

(56) References Cited

U.S. PATENT DOCUMENTS 4,777,416 A 10/1988 George, II
7,451,549 B1 11/2008 Sodhi
(Continued)

FOREIGN PATENT DOCUMENTS

WO 2016012530 A1 1/2016
WO 2016191875 A1 12/2016
WO 2018127209 A1 7/2018

OTHER PUBLICATIONS

International Preliminary Report on Patentability dated Feb. 11, 2021 from International Application No. PCT/Ib2019/056462, 8 pages.
(Continued)

*Primary Examiner* — Vernal U Brown
(74) *Attorney, Agent, or Firm* — Withrow & Terranova, P.L.L.C.

(57) ABSTRACT

Methods and systems related to a charging station for a tracked mobile object are disclosed. In one embodiment, a charging station is provided. The charging station comprises a charging port for a remote control, a regulator that provides power from a power source to the charging port, a transceiver that transmits an outbound positioning signal to the remote control, and a non-transitory computer-readable medium storing instructions for a method. The method comprises at least one of generating the outbound positioning signal and receiving an inbound positioning signal.

20 Claims, 3 Drawing Sheets

(51) Int. Cl.
   *B60L 53/16*   (2019.01)
   *G05D 1/02*    (2020.01)

(56) References Cited

U.S. PATENT DOCUMENTS

| | | | |
|---|---|---|---|
| 7,554,443 | B1 | 6/2009 | Alexander et al. |
| 7,643,939 | B2 | 1/2010 | Zeng |
| 8,005,635 | B2 | 8/2011 | Lin |
| 8,825,426 | B2 | 9/2014 | Chowdhary et al. |
| 9,229,084 | B2 | 1/2016 | Tu |
| 9,849,376 | B2 | 12/2017 | Wilson |
| 9,885,574 | B2 | 2/2018 | Moore |
| 10,821,848 | B2 | 11/2020 | Colafrancesco et al. |
| 2005/0094610 | A1 | 5/2005 | De Clerq |
| 2008/0186176 | A1 | 8/2008 | Hardacker et al. |
| 2014/0274115 | A1 | 9/2014 | Michalson et al. |
| 2014/0365154 | A1 | 12/2014 | Moore |
| 2015/0334334 | A1* | 11/2015 | White .............. H04N 21/42204 348/734 |
| 2015/0340782 | A1* | 11/2015 | Amini .................... H01R 12/52 439/629 |
| 2016/0241148 | A1 | 8/2016 | Kizilyalli et al. |
| 2017/0077743 | A1* | 3/2017 | Liu ......................... H02J 7/025 |

OTHER PUBLICATIONS

Decawave Ltd, Are Home Robots Ready to Play in Internet of Things?, Aug. 4, 2015 (Available at: https://www.decawave.com/news/current-news/are-home-robots-ready-play-internet-things) (Accessed on: Jul. 11, 2018).

International Search Report and Written Opinion dated Nov. 25, 2019 from International Application No. PCT/IB2019/056462 filed Jul. 30, 2019, 11 pages.

Nonfinal Office Action dated Mar. 19, 2020 from U.S. Appl. No. 16/049,133, 26 pages.

Notice of Allowance dated Jul. 1, 2020 from U.S. Appl. No. 16/049,133, 17 pages.

Notice to File a Response for Korean Patent Application No. 10-2021-7006109, dated Aug. 19, 2022, 5 pages.

* cited by examiner

CHARGING STATION FOR TRACKED MOBILE OBJECT

CROSS-REFERENCE TO RELATED APPLICATIONS

This application is a continuation of U.S. patent application Ser. No. 16/049,133, filed Jul. 30, 2018, and incorporated by reference herein in its entirety for all purposes.

BACKGROUND

Certain electronic devices need to be tracked in physical space to serve their appointed function. The devices can be tracked using external sensors that receive wireless signals which are either reflected off or generated by the tracked device. The positioning system can then determine a position value for the device by analyzing the characteristics of the wireless signals using such approaches as multilateration (MLAT) or other techniques. A specific example of these kinds of devices is the universal remote controller developed and sold by 7hugs Labs which is tracked using an ultrawide band (UWB) positioning system with external wall mounted sensors that determine the position of the universal remote controller. The system can then determine where the remote is pointing so that commands entered on the controller are sent to the appropriate device. Similar systems can be used to track the position of specialized game controllers, pointing devices for interacting with a presentation or display, toys for virtual tag, and many other applications involving tracked electronic devices.

SUMMARY

Specialized charging devices for tracked objects and associated methods are disclosed herein. A charging device can be augmented to include a wireless transceiver that is used to assist in tracking the position of the object that the charging device is designed to charge. The charging device can be a charging station that both provides a dock for charging the tracked object and for transmitting wireless signals to conduct a tracking action and determine the location of the object. The charging device can conduct the tracking action alone or in combination with a positioning system including a set of external sensors.

A device exhibiting the combined functionality of both charging an object and tracking the position of the object provides certain benefits. The two kinds of functionality exhibit an appealing synergy because devices that need to be tracked tend to be mobile such that they will also need to be battery powered. Hence, a single device that provides both charging and tracking functionality is aptly suited to facilitate the operation of the tracked device. Furthermore, a charging station will generally include a wired connection and thereby have a large power budget to assist in reliable position tacking. Furthermore, if the charging station is connected to a wall socket, it will already be located in a fixed position which is an amenable characteristic for anchors in many positioning systems. Additional benefits associated with specific embodiments of the invention are disclosed in the detailed description below.

In one embodiment, a charging station is provided. The charging station comprises a charging port for a remote control, a regulator that provides power from a power source to the charging port, a transceiver that transmits an outbound positioning signal to the remote control, and a non-transitory computer-readable medium storing instructions for a method. The method comprises at least one of generating the outbound positioning signal and receiving an inbound positioning signal.

In another embodiment, a charging station is provided. The charging station comprises a charging port configured to connect with a remote control, a regulator for providing power from a power source to the charging port, and a transceiver that transmits and receives positioning signals to and from the remote control.

In another embodiment, a positioning system for generating a position value is provided. The system comprises a remote control for which the positioning system generates the position value, a set of positioning devices that transmit a set of positioning signals to the remote control, and a charging station. The charging station comprises a charging port for the remote control, a regulator that provides power from a power source to the charging port, and a transceiver that transmits an outbound positioning signal to the remote control. The positioning system generates the positioning value using the set of positioning signals from the set of positioning devices, and the outbound positioning signal.

DETAILED DESCRIPTION

Figure 1:
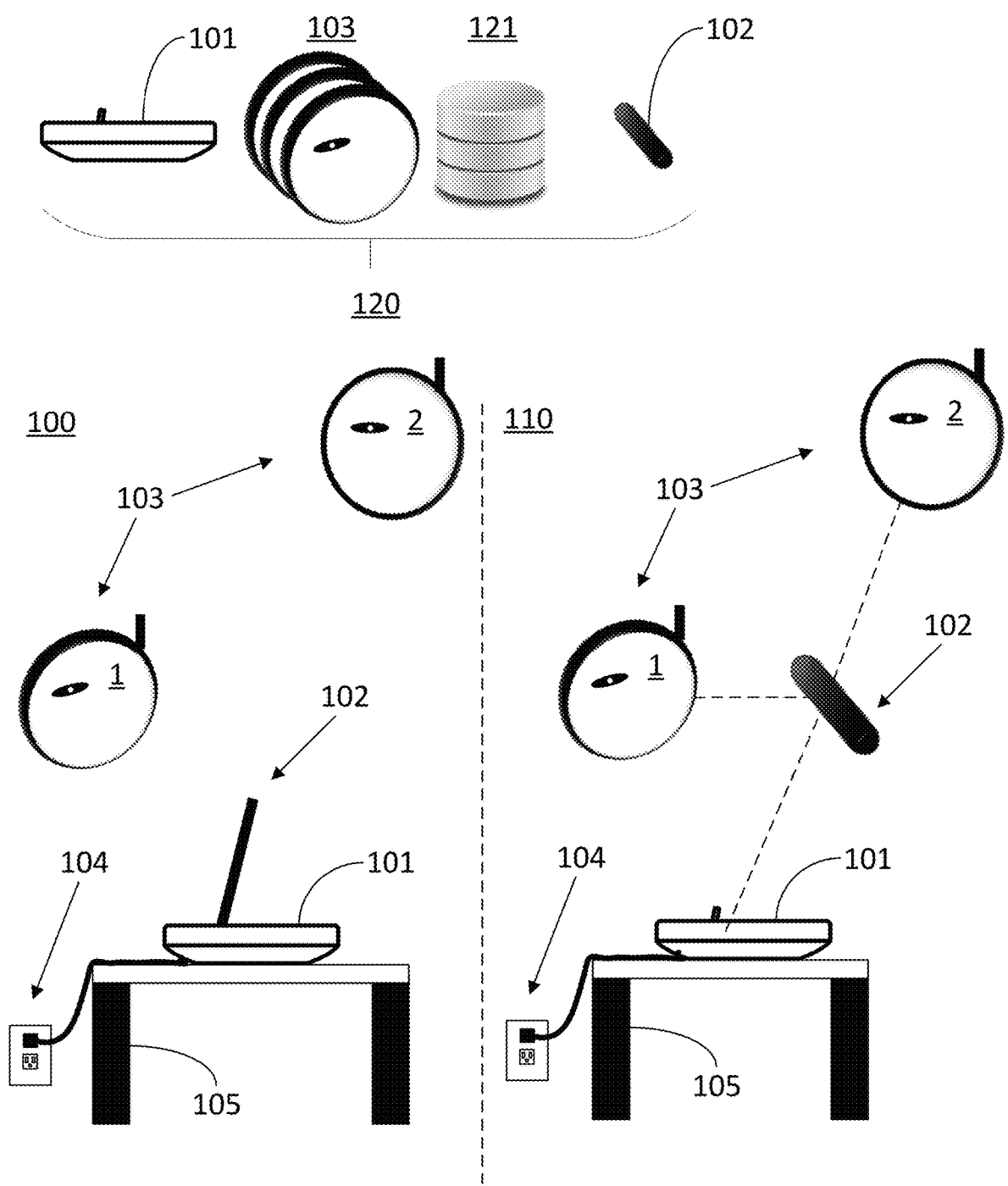
FIG. 1 illustrates a system for tracking an object and an associated charging device in two different states. In a first state, the charging device is charging the object. In a second state, the charging device is assisting with tracking the object. The charging device and system of FIG. 1 are in accordance with certain embodiments of the invention disclosed herein.

Specialized charging devices for tracked objects and associated systems and methods are disclosed in detail below. As described above, in specific embodiments, a charging device can be augmented to include a wireless transceiver that is used to assist in tracking the position of the object. The charging device can therefore provide both a source of power for the object and assist in tracking the device. Specific embodiments and variations of these concepts are disclosed below with reference to FIGS. 1-3. The specific embodiments of these concepts as disclosed in this section are provided for explanatory purposes and are not meant to limit the invention, the scope of which is provided by the appended claims.

In specific embodiments of the invention, a charging station will exhibit the functionality required for charging an object. The charging station can include a charging port for an object and a regulator that provides power from a power source to the charging port. The power source can be a mains power connection, provided with a standard electric wall socket, such as a 220-240 V 50 Hz or 120 V 60 Hz supply. The power source could also be a battery, such as a lithium, nickel, or lead acid battery, or an ultra-capacitor. The battery or capacitor could be charged via a periodic connection to a mains power connection, a solar cell, or some other form of energy. The charging station can include any kind of regulator used to condition the power received from the power source into a power characteristic (voltage and current) that is suitable for charging the object. The regulator can be a switching or linear regulator. The object can be charged via the charging port when the object is docked with the charging station such that power flows from the power source, through the regulator, to the charging port, and ultimately charges a battery or ultracapacitor on the object.

In specific embodiments of the invention, the charging station will also provide functionality for tracking the object. The charging station can include a wireless receiver for sensing wireless signals that have been either transmitted by the object or reflected off the object. The charging station can also include a wireless transmitter for transmitting wireless signals to the object to assist in the positioning operation. In one approach, the object can include an accelerometer or other sensors, and keep track of its position internally. The object can then send a wireless signal back to the device to report its position. In another approach, the charging station can conduct time of arrival (TOA) or angle of arrival (AOA) analysis on signals transmitted by the charging station and reflected off the device to track its position. In another approach, the charging station can track the position of the object in combination with a set of external positioning devices. The external positioning devices can transmit wireless signals towards the object which are then reflected off the object and measured by a wireless receiver on the charging station. The external positioning devices can also transmit wireless signals towards the charging station to allow the charging station to auto-locate itself within the positioning system. The external positioning devices can also receive wireless signals transmitted from the charging station directly to the external positioning devices or reflected off the object. The external positioning devices can be wall mounted beacons in an indoor positioning system. The wireless signals can be part of an ultra-wideband (UWB) positioning system that uses MLAT to track the object.

Figure 2:
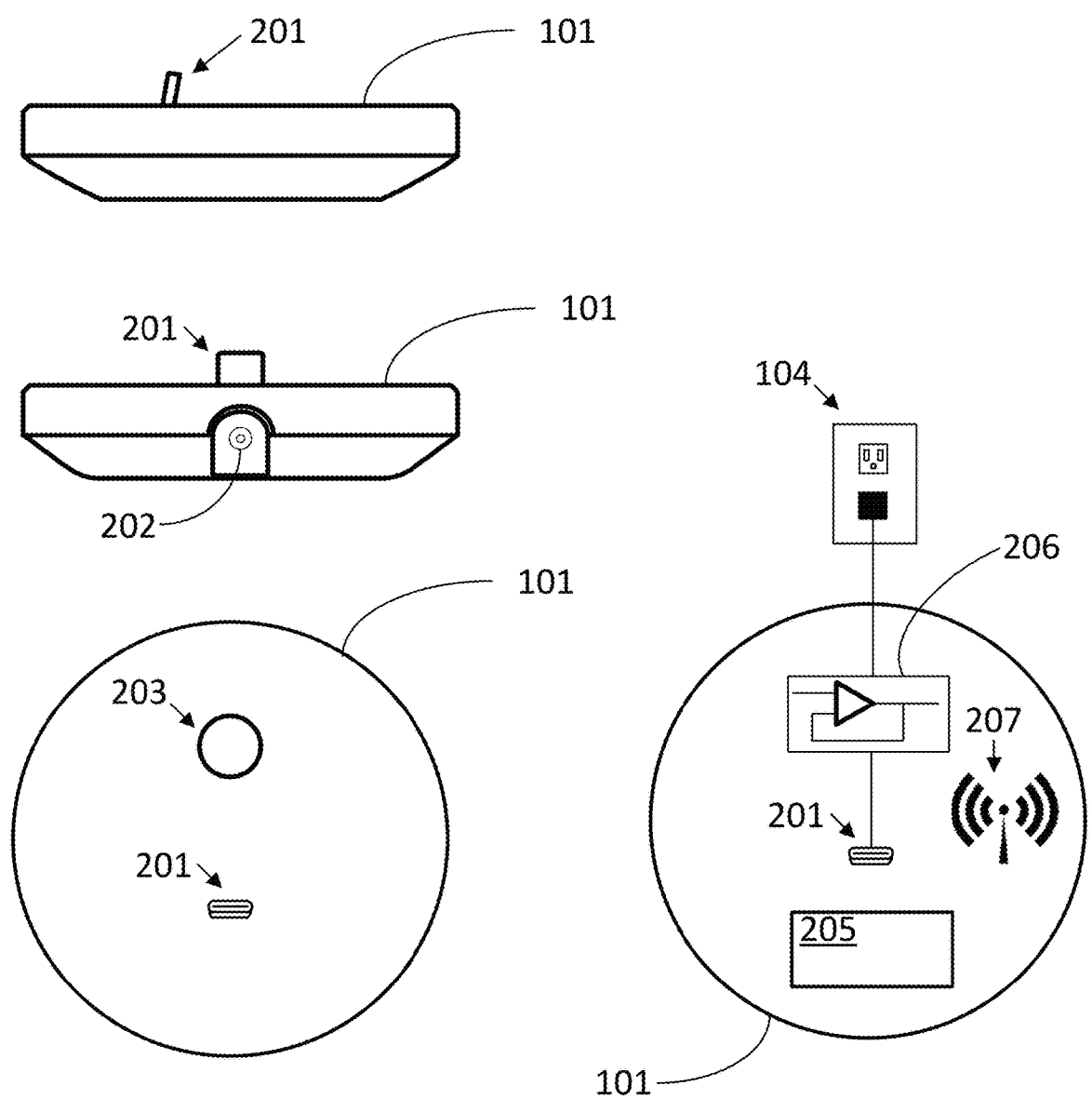
FIG. 2 includes a series of perspective views and a block diagram of a charging device that is in accordance with certain embodiments of the invention disclosed herein.

A set of specific embodiments of the invention can be described with reference to FIGS. 1 and 2. FIG. 1 illustrates charging station 101 operating in two states 100 and 110, along with a depiction of system 120 that can execute some of the methods disclosed herein. FIG. 2 illustrates three views of charging station 101 along with a block diagram of the internals of charging station 101. State 100 is defined by the charging station 101 being docked with object 102 while charging station 101 charges object 102. State 110 is defined by the charging station 101 being used to generate a position value for object 102.

State 100 involves the charging station 101 participating in the charging of object 102. In the illustrated case, object 102 is a wireless battery powered remote control. The remote control may require a system to provide a position value for the remote control so that the remote can either provide the appropriate controls for the device it is pointing at and/or so the system can route commands received on the remote to the appropriate device. In short, a positioning system may be needed to determine where the remote is pointing at any given time. Charging station 101 includes a wired connection to mains power source 104 via a wire connection from a wall socket to the charging station. Charging station 101 can include a port 202 for receiving the wire connection from power source 104. The internals of the charging station include a regulator 206 that conditions power received from mains power source 104 for delivery to object 102 via charging port 201 at a power characteristic optimized to charge object 102. In the illustrated case, the power delivered by the charging station 101 can be used to charge the batteries of the object 102.

In specific embodiments, the charging station can include a charging port and the charging port can take on various forms. The charging port can be configured to connect with the object in order to provide power to a power storage device on the object. In specific embodiments, the charging port will also be a data port for the object. Approaches in which the charging port can also be a data port include approaches in which the object includes software or firmware that can be updated, requires the wired delivery of data from an external source, or requires the wired transmission of data to an external source. For example, the object could be a universal remote and the remote could receive software updates when it is docked with the charging station. Any transfer of data can be conducted via this data port. In particular, transfers of data that are not immediately necessary and that might otherwise overly tax the internal power storage of the object can be transmitted through this data port. In the case of charging station 101, the charging port 201 can also be a data port for object 102.

The charging port could be configured to connect with an object in the sense that the charging port both held the object in place and provided power to the object. For example, the port could be a USB, USB-B, USB-C, Thunderbolt, Lighting, or HDMI port. The charging port could be configured to connect with an object by presenting a male or female interface positioned to accept a corresponding interface on the object. The charging device could also be configured to wirelessly charge the device through inductive coupling. In these embodiments, the charging device could present a target located over an inductive coupling antenna or be designed such that its entire upper surface was prepared to inductively charge an object placed on top of or otherwise in the vicinity of the charging device. If inductive coupling was utilized, the charging device could still communicate with the device while charging using a near field communication wireless protocol or through other wireless protocols such as Bluetooth, Zigbee, Z-wave, Wi-Fi, and other variants.

In specific embodiments, the charging port can hold the object at an angle to either improve the appearance of the unit overall, or to allow an integrated display on the object to display useful information when the device is docked. In situations in which the charging port was placed on a flat surface, as opposed to being wall mounted, the charging port could position the docked device vertically such that the display was perpendicular to a base of the charging station. In approaches in which the object is atheistically pleasing, this form of positioning is beneficial in the sense that the object itself is essentially on display while charging. Furthermore, if the device included an integrated display, the object could be configured to display useful information when docked. For example, the display could show how close the object is to being fully charged, or other useful information such as the time or temperature.

In specific embodiments, the charging port can maintain the object in a position that makes it easy to attach and/or detach. For example, the object could be placed into a cradle on the charging station such that the charging port on the charging device was guided to mate with a counterpart on the object as the object was dropped into the cradle. In another example, the benefits of the prior paragraph could be achieved while still allowing for easy detachment of the device by modifying a standard charging port to decrease the holding force of the connector. The charging port could be configured to allow the device to be placed directly onto the charging port and be held at an angle greater than 45 degrees above a main surface of the charging station. In these situations, the holding force of the connector could be set to less than the weight of the charging station or object, whichever is less. In the illustrated case, the charging port 201 is a modified USB-C connector where the holding force of a traditional USB-C connector has been decreased such that it was less than a weight of the object. In this and similar embodiments, the charging station has been designed to be heavier than the object. In these approaches, object 102 could be lifted smoothly off the charging port 201 without danger of lifting the entire apparatus up along with it.

In specific embodiments, a charging device will include a means for wirelessly determining a position value for the object. The means for wirelessly determining a position value for the object can include a wireless receiver on the charging device. The wireless receiver can receive a signal indicative of the position of the object. The wireless receiver can also receive a signal from which the position of the object can be derived such as via a TOA or AOA analysis conducted on the signal. The means for wirelessly determining a position value for the object can also include a processor and a computer-readable medium storing instructions to conduct the above mentioned derivations. In specific approaches, the means for wirelessly determining a position value for the object can include a wireless transmitter used to send out wireless signals for engaging in a wireless positioning process. For example, the transmitter could transmit an outbound positioning signal to the object. In these approaches, the computer-readable medium could store instructions to generate an outbound positioning signal, receive an inbound positioning signal, and process the inbound positioning signal to determine a position value for the object. In specific approaches, the charging device can both transmit and receive wireless signals using a single transceiver on the charging device. In specific embodiments, the charging device can communicate with a set of external devices to determine the position value. For example, the charging device could rely on positioning signals generated by dedicated positioning devices to generate a position value, or it could rely on a central external server to derive the position value from a set of wireless signals observed by the charging device.

In specific embodiments, a system will include a means for wirelessly determining a position value for the charging device. The system may use the position value of the charging device to derive a more meaningful or more accurate position value for the object. For example, in an MLAT system, the positions of the positioning devices are all determined in order to derive and cross check a position value that coheres with the derived positions of all the devices in the system. The means for wirelessly determining the position value for the charging device can also communicate with a set of external devices. The charging device can receive an inbound auto-positioning signal from these external devices. The charging device can receive the inbound auto-positioning signal using a transceiver that was also used to generate outbound positioning signals transmitted to the object. The charging device can include computer-readable instructions to execute these actions either alone or in combination with external devices. The same processor used to process signals for conducting the derivations necessary to generate a position value for the object can be used to generate the position value for the charging device.

State 110 involves the charging station 101 participating in the tracking of object 102. Charging station 101 can include a processor 205 that is used to determine a position value for object 102 either by itself or in combination with external devices. The wireless transceiver 207 can transmit an outbound positioning signal to the object. Reflections of that signal, or responses to that signal, can then be used by the processor to derive a position of the object. The processor may also consider the characteristics of the outbound signal when determining the position value of the object in those derivations. The reflections can be measured by wireless transceiver 207 or by other devices. In the illustrated case, charging station 101 is participating in the tracking of object 102, and is not tracking the object independently. Instead, charging station 101 is operating with a positioning system for generating a position value for object 102. The system for generating the position value for the object can be system 120 and can include computer-readable media and processors on object 102 itself. System 120 includes a set of external positioning devices in the form of wall mounted beacons 103. The set of wall mounted beacons 103 include a first beacon 1 and a second beacon 2. As illustrated by the dotted lines in the depiction of state 110, beacon 1, beacon 2, and charging station 101 each receive signals that are reflected off object 102 to participate in generating a position value for object 102.

In the illustrated case, the processor relies on the cooperation of a set of external positioning devices 103. The charging station can also generate the positioning value in combination with data from a remote server 121 or the execution of instructions on remote server 121 for purposes of conducting the methods disclosed herein. The processor can generate the position value after analyzing signals received by a wireless receiver such as via wireless transceiver 207.

In specific embodiments in which the charging device operates in combination with external devices, the unique angle of the charging device relative to those external devices can contribute to a more accurate derivation of the positioning value. This is because the requirements for the location of the charging device may differ from the requirements for location of the external positioning device. For example, the charging device may be a charging station for a mobile object meant to be used indoors. More specifically, the charging device may be a charging station configured for placement on a flat surface, such as a coffee table or cabinet top, while the external positioning devices are wall-mounted beacons. The charging station may include a base for supporting the charging station. In these approaches, the charging station can improve the performance of the tracking system in an innocuous way by providing a different angle of view towards the tracked object without adding an additional device to the system. The charging station could further include a transceiver that is positioned to transmit and receive positioning signals at an angle above the base. These approaches provide certain benefits in that the object will likely be in a plane that lies above the charging station but below the external positioning device. The overall system may therefore provide a more accurate reading because the polarity of the heading vector for the object can be more readily derived.

The object being tracked by the positioning systems disclosed herein can be any object whose position needs to be determined by an automated system with a high degree of accuracy. The object can be a pointing device such as a remote control, presentation pointer, inventory management device, or a toy used for wireless tag. The pointing device will have a defined pointing direction which is associated with a heading the user aligns a target with when pointing. In other embodiments, the object can be a drone, smart phone, tablet computer, wearable computing device, or any other computing device. In the specific example of FIG. 1, object 102 is a dedicated device that operates as a universal controller. The controller can operate to control one or more electronic devices and may transmit signals to these devices using any form of wireless transmitter. The tracking system can be used to determine which device the controller is pointing towards at any given time.

Figure 3:
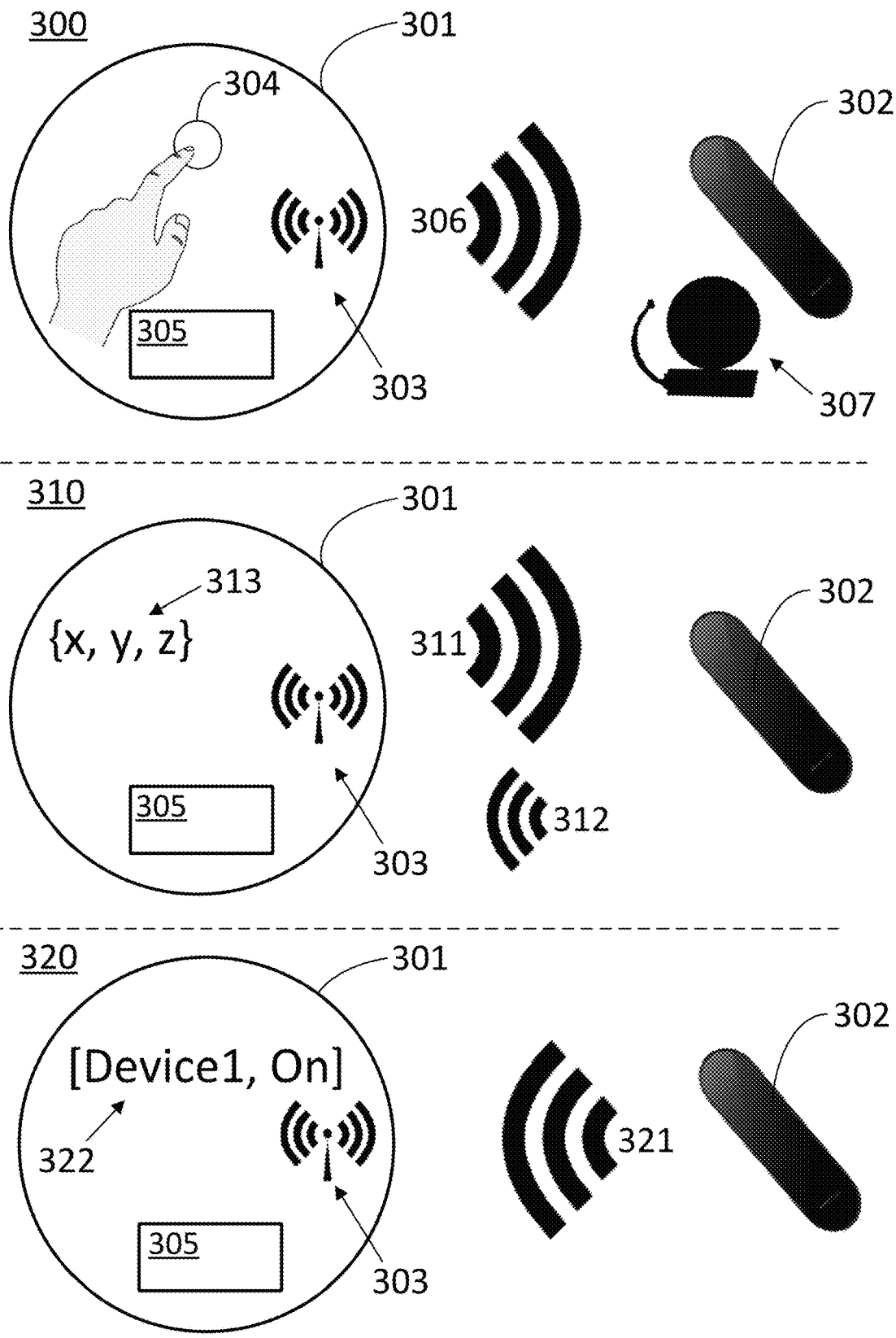
FIG. 3 illustrates multiple uses of a single transceiver on a charging station that are in accordance with certain embodiments of the invention disclosed herein.

In specific embodiments, a single wireless transceiver on the charging device can be used for multiple purposes. For example, the transceiver could be used to transmit and receive the positioning signals used to track the object as well as signals for other purposes such as sending commands to the object, receiving commands from the object, receiving data measured by the object, or transmitting a locate-assist signal to the object. The multiple uses will depend on the characteristics of the object. FIG. 3 provides an example of multiple uses for the single transceiver if the object is a remote control.

FIG. 3 illustrates a charging station 301 from a top-down perspective. The charging station includes a wireless transceiver 303, a processor 305, and a user interface 304 in the form of a simple press button. The charging station is shown in three different states 300, 310, and 320 to illustrate the multiple uses of the transceiver 303. In state 310, transceiver 303 is being used to transmit positioning signals 311 to object 302, and receive positioning signals 312 from object 302. The received signals are then used by processor 305 to derive a position value for the object 302. States 300 and 320 illustrate how the same transceiver can be used for other purposes.

As mentioned above, the same transceiver used to transmit and receive position values for an object can be used to transmit a locate-assist signal to the object. All objects have the potential to be misplaced. In the case of a remote control being used in an internal environment, the remote could fall behind a piece of furniture and be difficult to quickly locate. In specific embodiments, the object could include a locate-assist feature such that when a user interface on the charging device was engaged, a wireless signal could be sent to the object to make the object generate an audible signal such as a siren to allow someone to easily locate the object. The charging device could include a single transceiver used to transmit signals to position the object with a tracking system and to transmit such a locate-assist signal to the object. In certain approaches, the same wireless protocol and/or transmitter could be used to transmit outbound positioning signals from the charging device and the locate-assist signal. The wireless protocol could be a UWB protocol. As seen in FIG. 3, the user interface 304 can receive a press input from a user, and transceiver 303 can transmit a locate-assist signal in response to this input. Upon receiving the locate-assist signal, object 302 can conduct an action that makes it easier to find. For example, object 302 could trigger an internal alarm, depicted by alarm bell 307, to being sounding so that a user could quickly locate the object 302 by following the sound.

As mentioned above, the same transceiver used to transmit and receive position values for an object can be used to receive command signals from the object. For example, if the object were a remote control designed to receive controller inputs from the user, the single wireless transceiver used for the positioning signals on the charging device could also be used to receive controller input signals from the remote. The object could be designed to transmit those controller inputs to the charging station wirelessly via a controller input signal so that the system could process the controller inputs appropriately. In certain approaches, the same wireless protocol and/or transmitter could be used to transmit outbound positioning signals from the charging device and receive controller input signals from the object. The wireless protocol could be a UWB protocol. The charging station could include a wired connection, or a more resource intensive wireless connection than the one used to communicate with the remote, to send the controller inputs on to an external server or directly to a device to which the command was directed. The processor on the charging station could be used to process the command inputs and take the appropriate action in response thereto. In approaches in which a different wireless protocol was used to route the commands on from the charging station to other devices, the charging station could include another transceiver dedicated for this purpose. For example, the object could receive the controller input signal on a UWB transceiver and then transmit the commands to another device using a dedicated Zig-bee or Z-wave transceiver. Similar approaches could be used if the object was used to collect data where the controller input signals were replaced with data signals.

As seen in FIG. 3, the object 302 could receive a controller input and transmit the controller input to charging station 301 via a controller input signal 321. This signal could then be received by transceiver 303 and processed by processor 305. The processor would then be able to derive command 322 from the controller input signal and route the command to the appropriate system. In the illustrated case, charging station 301 may be able to determine on its own that the device for which the command "on" was intended was "Device 1." To make this determination, processor 305 would need to have a position value for object 302 and an understanding of what devices corresponded to which positions for the remote. If charging station 301 did not have this information, it could pass the controller input to an external device, such as an external server, where the command would be derived and ultimately routed to "Device 1."

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the example of a mobile charging station with a cord for plugging into a supply has been used as an example environment throughout this disclosure, similar approaches could be applied to permanently installed charging devices built into the walls of a home or into fixed structures in an outdoor environment. These and other modifications and variations to the present invention may be practiced by those skilled in the art, without departing from the scope of the present invention, which is more particularly set forth in the appended claims.

What is claimed is:

1. A positioning system for determining and using a position value, the positioning system comprising:
   a pointing device for which the positioning system determines the position value; and
   a charging device comprising:
      a charging port for the pointing device;
      a regulator that provides power from a power source to the charging port; and
      at least one transceiver that transmits an outbound positioning signal to the pointing device, and that receives at least one command signal from the pointing device;
   wherein the positioning system determines the position value using the outbound positioning signal; and
   wherein the positioning system determines a device for which the at least one command signal is intended based on the position value, and routes the at least one command signal from the charging device to the device for which the at least one command signal is intended.

2. The positioning system of claim 1, wherein:
the charging device is configured to wirelessly charge the pointing device.

3. The positioning system of claim 1, the charging device further comprising:
an inductive coupling antenna; and
a target located over the inductive coupling antenna.

4. The positioning system of claim 3, wherein:
the charging device is configured to communicate with and charge the pointing device using the inductive coupling antenna.

5. The positioning system of claim 1, wherein:
the transceiver receives an inbound auto-positioning signal; and
the positioning system determines the position value using the outbound positioning signal and the inbound auto-positioning signal.

6. The positioning system of claim 1, wherein the positioning system does one of:
determine the position value after the outbound positioning signal is reflected off the pointing device; and
determine the position value after a receiver on the pointing device receives the outbound positioning signal, and the pointing device responds to the outbound positioning signal.

7. The positioning system of claim 1, wherein:
the charging port is a USB-C port.

8. The positioning system of claim 1, wherein:
the charging port is also a data port for the pointing device.

9. The positioning system of claim 1, wherein the charging device further comprises:
a user interface;
wherein the charging device generates a locate-assist signal in response to a command from the user interface;
wherein the transceiver transmits the locate-assist signal to the pointing device; and
wherein the locate-assist signal and the outbound positioning signal are wirelessly transmitted using the same wireless protocol.

10. The positioning system of claim 1, wherein:
the power source is a battery or ultra-capacitor.

11. The positioning system of claim 1, wherein:
the charging device is a charging station.

12. The positioning system of claim 1, wherein:
the pointing device is a smart phone.

13. The positioning system of claim 1, further comprising:
a positioning device that transmits a positioning signal to the pointing device; and wherein the positioning system determines the position value using:
(i) the positioning signal from the positioning device; and
(ii) the outbound positioning signal.

14. The positioning system of claim 13, wherein:
the positioning system determines the position value using a multilateration analysis.

15. The positioning system of claim 1, wherein:
the transceiver receives a controller input signal from the pointing device;
the controller input signal includes a controller input charging device processes the controller input from the pointing device; and
the controller input and the outbound positioning signal are wirelessly transmitted using the same wireless protocol.

16. A method for determining and using a position value for a pointing device, the method comprising:
charging the pointing device via a charging port on a charging device;
one of: (i) receiving a positioning signal transmitted by the charging device; or (ii) reflecting the positioning signal transmitted by the charging device, wherein the position value is determined using one of: (A) a reflection of the positioning signal off of the pointing device; and (B) a responsive transmission generated on the pointing device and in response to the positioning signal;
receiving a command signal from the pointing device; and
determining a device for which the at least one command signal is intended based on the position value, and routing the at least one command signal from the charging device to the device for which the at least one command signal is intended.

17. The method of claim 16, wherein:
the charging of the pointing device is conducted wirelessly.

18. The method of claim 16, further comprising:
placing the pointing device on a target on the charging device; and
wherein the charging of the pointing device is conducted using an inductive coupling antenna located below the target.

19. The method of claim 16, wherein: the pointing device is a smart phone.

20. One or more non-transitory computer readable media storing instructions which, when executed by one or more processors in a system, cause the system to execute a method for determining and using a position value for a pointing device comprising:
charging the pointing device via a charging port on a charging device;
transmitting an outbound positioning signal from the charging device to the pointing device;
determining the position value using one of: (i) a reflection of the outbound positioning signal off of the pointing device; and (ii) a responsive transmission, by the pointing device, generated on the pointing device and in response to the outbound positioning signal;
receiving a command signal from the pointing device; and
determining a device for which the at least one command signal is intended based on the position value, and routing the at least one command signal from the charging device to the device for which the at least one command signal is intended.

* * * * *